(12) United States Patent
Crudgington et al.

(10) Patent No.: US 6,799,766 B2
(45) Date of Patent: Oct. 5, 2004

(54) BRUSH SEAL ELEMENT

(75) Inventors: Peter Francis Crudgington, Bath (GB); Aaron Bowsher, Wilts (GB)

(73) Assignee: Cross Manufacturing Company (1938) Limited, Avon (GB)

( * ) Notice: Subject to any disclaimer, the term of this patent is extended or adjusted under 35 U.S.C. 154(b) by 0 days.

(21) Appl. No.: 10/351,147

(22) Filed: Jan. 24, 2003

(65) Prior Publication Data
US 2003/0141666 A1 Jul. 31, 2003

(30) Foreign Application Priority Data
Jan. 25, 2002 (GB) ................................. 0201666

(51) Int. Cl.⁷ .................................. F16J 15/44
(52) U.S. Cl. ........................................ 277/355
(58) Field of Search .......................... 277/355

(56) References Cited

U.S. PATENT DOCUMENTS

| | | | | |
|---|---|---|---|---|
| 2,878,048 A | * | 3/1959 | Peterson | 277/355 |
| 4,600,202 A | * | 7/1986 | Schaeffler et al. | 277/355 |
| 5,308,088 A | * | 5/1994 | Atkinson et al. | 277/355 |
| 5,351,971 A | * | 10/1994 | Short | 277/355 |
| 5,401,036 A | | 3/1995 | Basu | |
| 5,799,952 A | * | 9/1998 | Morrison et al. | 277/355 |
| 5,884,918 A | | 3/1999 | Basu et al. | |
| 6,173,962 B1 | | 1/2001 | Morrison et al. | |
| 6,186,508 B1 | * | 2/2001 | Zajchowski et al. | 277/355 |
| 6,254,344 B1 | * | 7/2001 | Wright et al. | 415/231 |
| 6,416,057 B1 | * | 7/2002 | Adams et al. | 277/355 |
| 6,565,094 B2 | * | 5/2003 | Wright et al. | 277/355 |
| 2002/0050684 A1 | * | 5/2002 | Kono | 277/355 |

FOREIGN PATENT DOCUMENTS

| | | |
|---|---|---|
| EP | 0453315 A1 * | 10/1991 |
| EP | 0 453 315 A1 | 10/1991 |
| EP | 0816726 A1 * | 1/1998 |
| EP | 1 018 613 | 7/2000 |
| EP | 1 077 338 | 2/2001 |
| EP | 1 203 905 | 5/2002 |

OTHER PUBLICATIONS

Michael & Irene Ash, "Handbook of Lubricants," Advertisement (no date) prior art.

* cited by examiner

Primary Examiner—Alison K. Pickard
(74) Attorney, Agent, or Firm—King & Schickli, PLLC

(57) ABSTRACT

A brush seal element is disclosed that includes an array of bristles and a backing member. The array of bristles extends across the face of the backing member and at least part of the surface of the face of the backing member is formed of or covered by a material which is tribologically matched, with at least the material of the bristles immediately adjacent the face. This allows the bristles to move on the material without inappropriate wear.

19 Claims, 2 Drawing Sheets

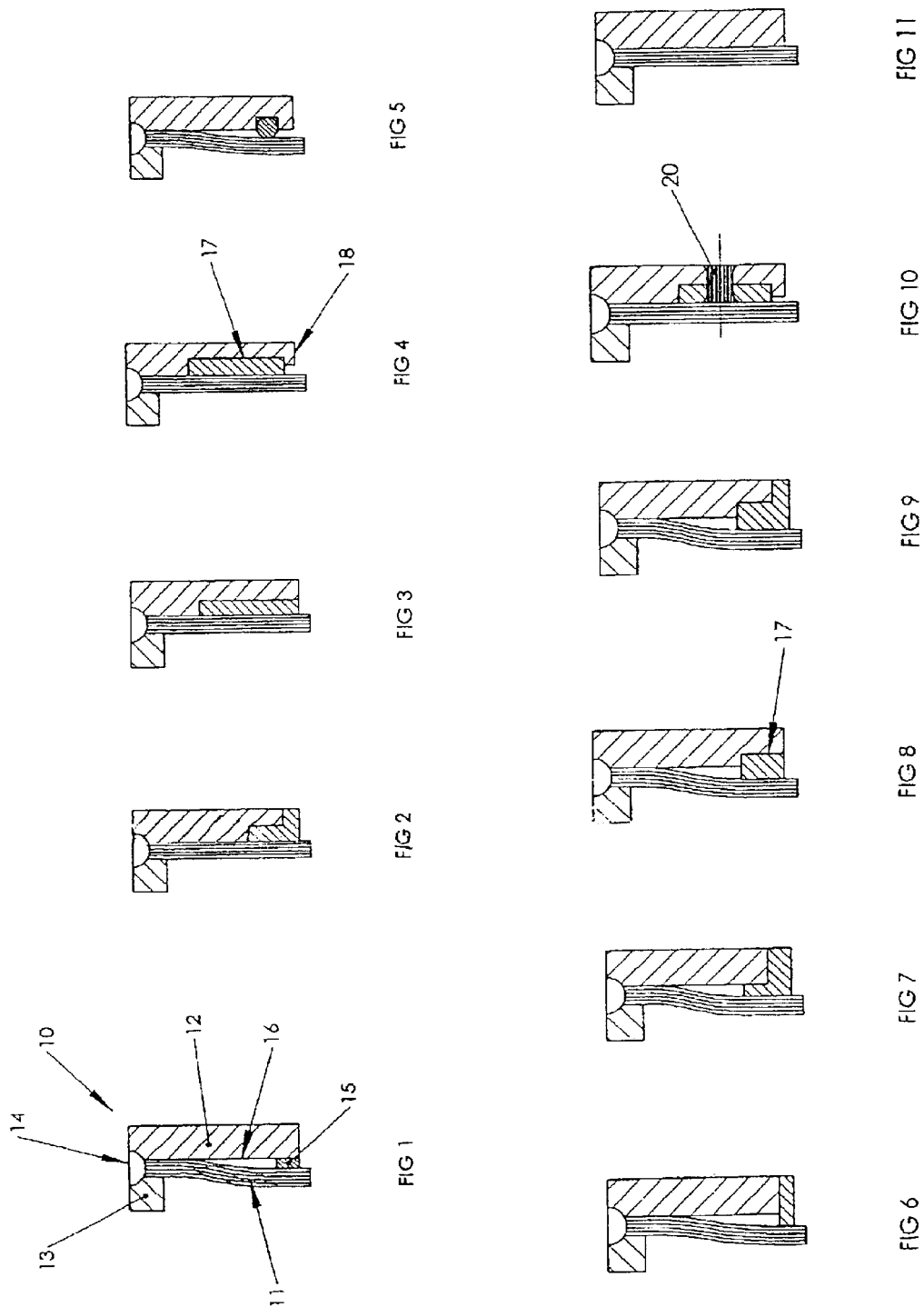

BRUSH SEAL ELEMENT

FIELD OF THE INVENTION

This invention relates to a brush seal element.

BACKGROUND TO THE INVENTION

Brush seals are frequently used in the turbine industry to form seals between areas of high and low pressure around, for example, rotating shafts. In a typical construction an array of bristles is mounted to extend radially into a space to seal with a rotary element and, on the low pressure side of the bristles, there is a backing plate to limit the deflection of the bristles due to the pressure difference across them. As the backing plate has no further structural function and is not movable during operation, it is frequently made of rather soft material in order to keep down cost. Further the material is often also chosen so as to match the coefficient thermal expansion of the seal housing material.

SUMMARY OF THE INVENTION

The Applicants have determined that the bristles can experience galling or fretting as they move relative to the back plate and this can lead to the progressive failure of the brush seal as layer after layer of bristles are removed. The wear particles can also be damaging within the system.

From one aspect the invention consists in a brush seal element including an array of bristles and a backing member, the array extending across the face of the backing member characterised in that at least part of the surface of the face of the backing member is formed of or covered by a material which is tribologoically matched (as hereinafter defined) with at least the material of the bristles immediately adjacent the face.

For the purposes of this specification "tribologically matched" means that the bristles can move on the material without inappropriate wear. This might, alternatively, be described as the material being "rub tolerant". In general appropriate materials will be of similar hardness to the bristle material and be relatively lubricious vis-à-vis the bristle material. By "similar hardness" it is meant that the material has a hardness of around −30% to +10% of the hardness of the bristles.

When tribologically matching the materials it may prove prudent in some cases to ensure that the back plate insert becomes the sacrificial part of the pair to ensure that no bristle wear takes place. In such cases, the hardness of the material may be down to around −50% of the hardness of the bristles. Typically, the coating is retained at the temperature of the brush seal during operation of a machine including the seal. The operating temperature of the machine can vary (the gas at a typical brush seal location is typically in the range 100° C. to 800° C.), but the temperature of the brush seal itself can be considerably higher due to frictional heating. This may be easily achieved with the shim or wire insert by making this material slightly softer than the hard materials of the bristles.

The element may be a one piece annular loop, round or straight seal, for a part of a multipiece segmented round or straight seal.

The element may include a perforate or open shim of tribolgically matched material located between the bristles and the backing plate. By having the shim open or perforate, thermal expansion can be accommodated within the shim without it buckling relative to the backing plate.

Alternatively an insert may be located in the face and may stand proud thereof. The insert may be welded, brazed or adhered to the face.

In a still further approach, the backing plate may be formed at least substantially of tribologically matched material, but this approach is only appropriate where the matched material has an acceptable coefficient of expansion. This will in turn depend on the construction of the seal housing.

Where the bristles are formed of a cobalt alloy the tribologically matched material may also be a cobalt alloy. Indeed, conveniently, the tribologically matched material may be the same as the bristle material.

The tribologically matched material may be deposited in the form of a coating, in which case it may be applied by arc flame or plasma spraying, detonation gun, high velocity oxygen fuel thermal spraying or physical vapour deposition. Suitable coating materials include chrome carbides or tungsten carbides.

According to another aspect of the invention there is provided a seal assembly including an insert substantially as defined above. According to yet another aspect of the invention there is provided a machine having a rotating shaft and including a seal assembly substantially as defined above.

Although the invention has been defined above, it is understood that it includes any inventive combination of the features set out above or in the following description.

BRIEF DESCRIPTION OF THE DRAWINGS

The invention may be performed in various ways and specific embodiments will now be described, by way of example, with reference to the accompanying drawings in which:

FIGS. 1 to 11 are schematic cross-sectional views through a brush seal showing respective embodiments;

DETAILED DESCRIPTION OF THE DRAWINGS

Figure 12:
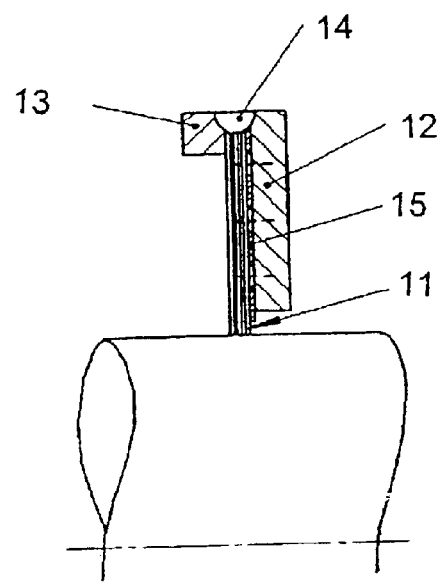
FIG. 12 is a corresponding view of an alternative arrangement.

In each of the Figures a brush seal 10 includes bristles 11, a backing plate 12 and a front plate 13 to which the bristles 11 and backing plate 12 are respectively connected. Typically the bristles and backing plate are, welded, brazed or adhered at 14. In each of FIGS. 1 to 11 the dimensions of a deposit or insert of tribological material 15 are exaggerated so that their presence can be clearly seen. An indication of likely dimensions are set out below. The brush seal will normally be circular and so the cross-sections can be taken as radial cross-sections through one side of the seal, but they can be linear in which case the cross-section is complete.

In FIG. 1 a rub tolerant or tribologically matched material 15 is applied as a coating to at least some of the face of the back plate material to the extent that it just holds the bristles 11 clear of the back plate 12. This may be applied by arc or plasma spraying, detonation gun, high velocity oxygen fuel spraying or physical vapour deposition. The bristle materials are typically cobalt alloys such as L605 (Haynes 25 or Haynes 188). The coating may be Chrome Carbide such as Praxair LC—1-C or Tungsten Carbide such as Praxair LW-1N40, Praxair Tribornet T104C, which is electroplated, or intermetallics such as T800, which may be flame or plasma sprayed. Praxair is a Trade Mark of Praxair Inc. Haynes is a trade mark of Haynes International.

As has been indicated, the material 15 could cover the whole of the face 16 of the backing plate 12, if cost and mismatching coefficients of thermal expansion allow. The arrangement in FIG. 7 is essentially similar except the bore 18 is also covered. This has an advantage during processing, because there is then no need to mask the bore 18 and the processing costs are reduced. FIGS. 8 and 9 equate to FIGS. 1 and 7 respectively except the deposition takes place into a shallow recess 17 on the back plate, which leads to a better definition of the top edge of the material 15.

FIGS. 2 and 3 correspond to FIGS. 9 and 8 respectively, except that in this case the material 15 has been ground down or deposited to lie flush with the front face 16.

In FIG. 4 the material 15 has been inserted and brazed, spot welded or otherwise bonded into a recess 17 in the back plate. To assist retention the recess 17 stops short of the bore 18. If viewed through the bristles, it would be seen that the material 15 is in a series of short segments located end to end with each other with small spaces to allow for thermal expansion. FIG. 5 is the equivalent, but here the material is presented in the form of a wire segment let into a groove. The wire may be round or generally square.

In FIG. 6 the material 15 is in the form of a thin strip of material brazed, spot welded or bonded to the back plate bore 18. As this is at the very extremity of the backing plate 12, it must stand proud of the backing plate 12 to ensure that the bristles rub against it and not the backing plate.

In FIG. 10 which is essentially equivalent to FIG. 4, the material segments are held by rivets 20.

In FIG. 11 the backing plate itself is made of the material 15. As previously indicated this option is only available when the coefficients of thermal expansion are appropriate.

Usually, however, the backing plate will be Nickel Alloys such as Hastelloy, Hastelloy S, Nimonic 75, Inconel 718, Incoloy, Inconel and 909. Incoloy and Nimonic are trade marks of Special Metals Corporation. Hastelloy is a trade mark of Haynes International. Alternatively stainless steels such as 409. 410. 304L. 316 or 321 may be used.

The bristles 11 are typically Cobalt alloys such as L605 (Haynes 25) or Haynes 188. The shim, inserts or wire may also be Cobalt alloys such as L605, Haynes 188 or Stellite 6B. Stellite is a Trade Mark of Deloro Stellite.

Figure 13:
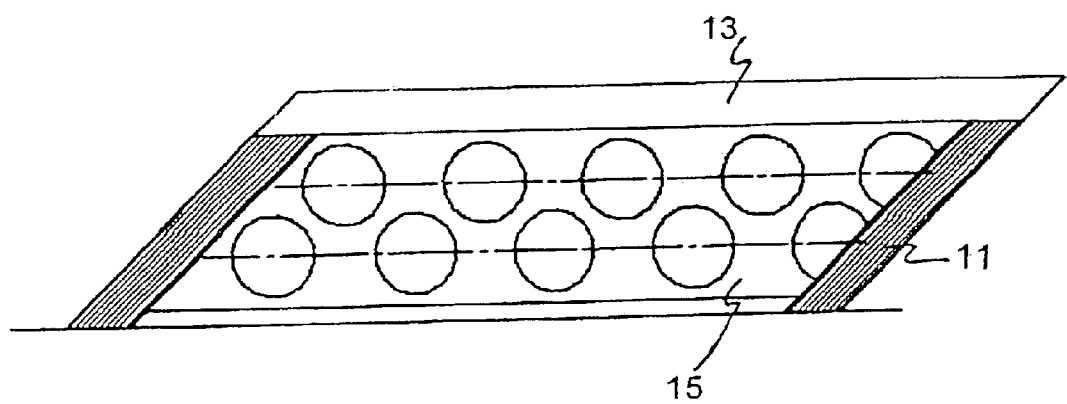
FIG. 13 is a front view of the seal of FIG. 12, with some of the bristles removed for clarity.

Turning to FIGS. 12 and 13, here the material 15 is presented in the form of a perforate shim (mentioned below), which lies between the backing plate 12 and the bristles 11. The perforations prevent the shim buckling due to mismatch of coefficient of thermal expansion. In one embodiment the shim could be in the form of a frame.

We claim:

1. A brush seal element including an array of bristles and a backing member, the array extending across the face of the backing member characterised in that at least part of the surface of the face of the backing member is covered by a material which is tribologically matched with at least the material of the bristles immediately adjacent the face, wherein the material is an insert or a coating on the backing member that projects past the face to hold the bristles away from the face such that an open space is created between the bristles and the face.

2. An element as claimed in claim 1 wherein the insert is in the form of a wire.

3. An element as claimed in claim 2 wherein the insert is received in channel or groove in the face.

4. An element as claimed in claim 2 wherein the insert is welded, brazed or adhered to the face.

5. An element as claimed in claim 1 wherein the tribologically matched material is lubricious relative to the bristle material and/or hard relative to the bristle material.

6. An element as claimed in claim 1 wherein the bristles are formed of a cobalt alloy.

7. An element as claimed in claim 1 wherein the tribologically matched material is the same as the bristle material.

8. An element as claimed in claim 1 wherein the coating is applied by arc flame or plasma spraying, detonation gun, high velocity oxygen fuel thermal spraying or physical vapour deposition.

9. An element as claimed in claim 1 wherein the coating materials are chrome carbides or tungsten carbides.

10. An element as claimed in claim 1 wherein the coating is sacrificial.

11. An element as claimed in claim 10 wherein the hardness of the material is down to around −50% of the hardness of the bristles.

12. An element as claimed in claim 1, wherein the hardness of the material is around −30% to +10% of the hardness of the bristles.

13. A seal assembly including an element as claimed in claim 1.

14. A machine having a rotating shaft and including a seal assembly as claimed in claim 13.

15. A machine as claimed in claim 14, wherein the tribologically matched material is in the form of a coating and the coating is retained at the temperature of the brush seal during operation of a machine including the seal.

16. An element as claimed in claim 1 wherein the insert is received in channel or groove in the face.

17. An element as claimed in claim 1 wherein the insert is welded, brazed or adhered to the face.

18. A brush seal element including an array of bristles and a backing member, the array extending across the face of the backing member characterized in that at least part of the surface of the face of the backing member is covered by a material which is tribologically matched with at least the material of the bristles immediately adjacent the face, wherein the material is an insert on the backing member that projects past the face to hold the bristles away from the face.

19. An element as claimed in claim 18 wherein the inset comprises a perforate or open shim of tribologically matched material located between the bristles and the backing member.

* * * * *